US010583477B2

(12) United States Patent
Nakagawa et al.

(10) Patent No.: US 10,583,477 B2
(45) Date of Patent: Mar. 10, 2020

(54) APPARATUS, METHOD, AND PROGRAM FOR DETECTING MOLTEN METAL SURFACE LEVEL IN CONTINUOUS CASTING MOLD

(71) Applicant: NIPPON STEEL & SUMITOMO METAL CORPORATION, Tokyo (JP)

(72) Inventors: Junichi Nakagawa, Tokyo (JP); Yuuji Hiramoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 243 days.

(21) Appl. No.: 15/519,328

(22) PCT Filed: Oct. 14, 2015

(86) PCT No.: PCT/JP2015/079040
§ 371 (c)(1),
(2) Date: Apr. 14, 2017

(87) PCT Pub. No.: WO2016/060164
PCT Pub. Date: Apr. 21, 2016

(65) Prior Publication Data

US 2017/0232505 A1 Aug. 17, 2017

(30) Foreign Application Priority Data

Oct. 15, 2014 (JP) ................................ 2014-210712

(51) Int. Cl.
*B22D 11/18* (2006.01)
*B22D 11/041* (2006.01)
*G01F 23/22* (2006.01)

(52) U.S. Cl.
CPC .......... *B22D 11/182* (2013.01); *B22D 11/041* (2013.01); *G01F 23/22* (2013.01)

(58) Field of Classification Search
CPC ............................ B22D 11/041; B22D 11/182
See application file for complete search history.

(56) References Cited

U.S. PATENT DOCUMENTS 3,478,808 A * 11/1969 Adams .................. B22D 11/16 164/453
4,126,041 A 11/1978 Doi et al.
(Continued)

FOREIGN PATENT DOCUMENTS

JP 53-26230 3/1978
JP 2-251346 A 10/1990
(Continued)

OTHER PUBLICATIONS

EPO machine translation of JP 2004-025202 A (Year: 2004).*
International Search Report for PCT/JP2015/079040 (PCT/ISA/210) dated Jan. 19, 2016.
Written Opinion of the International Searching Authority for PCT/JP2015/079040 (PCT/ISA/237) dated Jan. 19, 2016.
(Continued)

*Primary Examiner* — Kevin E Yoon
(74) *Attorney, Agent, or Firm* — Birch, Stewart, Kolasch & Birch, LLP

(57) ABSTRACT

A heat flux derivation unit (202) derives a value $q_y$ of a y-axis direction component of a heat flux vector. A molten metal surface level derivation unit (203) derives, as a molten metal surface level, a position where the absolute value of the value $q_y$ of the y-axis direction component of the heat flux vector whose y-axis component vector is in a direction opposite to a casting direction is maximum.

9 Claims, 9 Drawing Sheets

(56) References Cited

U.S. PATENT DOCUMENTS

| | | | | |
|---|---|---|---|---|
| 4,320,656 | A * | 3/1982 | Tiskus | G01F 23/22 73/295 |
| 4,570,230 | A * | 2/1986 | Wilson | G01F 23/22 164/450.3 |
| 4,597,048 | A * | 6/1986 | Mazur | B22D 11/202 700/146 |
| 4,729,420 | A | 3/1988 | Flemming et al. | |
| 5,360,051 | A | 11/1994 | Takahashi et al. | |
| 6,776,217 | B1 * | 8/2004 | Streubel | B22D 2/006 164/452 |

FOREIGN PATENT DOCUMENTS

| | | | |
|---|---|---|---|
| JP | 8-281402 | A | 10/1996 |
| JP | 2004-25202 | A | 1/2004 |
| JP | 4681127 | B2 | 5/2011 |
| JP | 2011-245507 | A | 12/2011 |

OTHER PUBLICATIONS

International Preliminary Report on Patentability and English translation of the Written Opinion of the International Searching Authority (forms PCT/IB/373, PCT/ISA/237 and PCT/IB/338), dated Apr. 27, 2017, for International Application No. PCT/JP2015/079040.

Canadian Office Action issued in corresponding Canadian Patent Application No. 2,963,467 dated Apr. 27, 2018.

Extended European Search Report issued in corresponding European Patent Application No. 15851433.1 dated Apr. 17, 2018.

Kumar, "Mould Thermal Response and Formation of Defects in the Continuous Casting of Steel Billets", PhD Thesis (1996) The University of British Columbia pp. 1-310.

Thomas, B.G., "On-line Detection of Quality Problems in Continuous Casting of Steel", in Modeling, Control and Optimization in Ferrous and Nonferrous Industry, 2003 Materials Science & Technology Symposium, F. Kongoli, B.G. Thomas, and K. Sawamiphakdi eds., (Chicago, IL, Nov. 10-12, 2003), TMS, Warrendale, PA, 2003, pp. 29-45.

* cited by examiner

APPARATUS, METHOD, AND PROGRAM FOR DETECTING MOLTEN METAL SURFACE LEVEL IN CONTINUOUS CASTING MOLD

TECHNICAL FIELD

The present invention relates to an apparatus, a method, and a program for detecting a molten metal surface level in a continuous casting mold, and is suitably used for detecting the molten metal surface level in the continuous casting mold.

BACKGROUND ART

In operating a continuous casting facility, it is necessary to detect the molten metal surface level in the continuous casting mold and stably control the molten metal surface level. This is because the internal quality of a cast slab can be improved by preventing overflow of molten steel and roll-in of suspended substance. The molten metal surface level refers to the height position of the surface of the molten steel. As a technique of detecting the molten metal surface level in the continuous casting mold, there are techniques described in Patent Literatures 1, 2. Note that the continuous casting mold is abbreviated as a mold as needed in the following description.

In Patent Literature 1, the following technique is disclosed. A plurality of temperature measurement elements are embedded in the mold at regular intervals along the casting direction of the mold (the height direction of the mold). The time change rate of the temperature at a point of each temperature measurement element is calculated to detect a temperature measurement element (n) exhibiting the maximum value of the time change rate. A position exhibiting the maximum value of a quadric curve linking the time change rate of the temperature measurement element (n) and the time change rates of two temperature measurement elements (n−1), (n+1) adjacent to the temperature measurement element (n) is obtained, and the position is regarded as the molten metal surface level.

Besides, in Patent Literature 2, the following technique is disclosed. A plurality of thermocouples are embedded in the mold at intervals along the casting direction of the mold (the height direction of the mold). For detecting the molten metal surface level, giving an initial temperature distribution and deciding a temporary molten metal surface level (division position) are performed first. Upon decision of the temporary molten metal surface level, the maximum heat flux and the minimum heat flux at the temporary molten metal surface level are calculated by analysis of heat conduction inverse problems using the temperature changes measured by the thermocouples. The maximum heat flux and the minimum heat flux at the temporary molten metal surface level are calculated with the temporary molten metal surface level changed. Among the calculated positions of the temporary molten metal surface levels, the temporary molten metal surface level where the difference between the maximum heat flux and the minimum heat flux defined by performing experiments in advance is smallest is regarded as the actual molten metal surface level.

CITATION LIST

Patent Literature

Patent Literature 1: Japanese Laid-open Patent Publication No. 53-26230

Patent Literature 2: Japanese Patent No. 4681127

SUMMARY OF INVENTION

Technical Problem

However, the technique described in Patent Literature 1 is based on the empirical rule that the position where the temperature in the casting direction of the mold is maximum exists near the molten metal surface, and this position is in a certain correlation with the molten metal surface level. In the case based on the empirical rule as described above, the detection accuracy of the molten metal surface level may decrease.

Besides, in the technique described in Patent Literature 2, the initial value (initial condition) of the temperature distribution is necessary when performing the analysis of heat conduction inverse problems by the non-stationary heat conduction equation. Further, the heat flux in the casting direction is calculated as a discrete value. Accordingly, also in the technique described in Patent Literature 2, the detection accuracy of the molten metal surface level may decrease. In particular, when the state of the molten steel inside the mold rapidly changes to increase the temporal change of the heat flux, the detection accuracy of the molten metal surface level may decrease.

The present invention has been made in consideration of the above points, and its object is to increase the detection accuracy of the molten metal surface level in the continuous casting mold.

Solution to Problem

An apparatus for detecting a molten metal surface level in a continuous casting mold of the present invention includes a computer processor including processing circuitry that acquires temperatures measured by a plurality of temperature measurement devices embedded in the continuous casting mold along a casting direction of the continuous casting mold; derives a value of a casting direction component of a heat flux vector on an inner wall surface of the continuous casting mold, based on a result of performing analysis of non-stationary heat conduction inverse problems from the temperatures acquired by the computer processor; and derives a molten metal surface level inside the continuous casting mold, based on the value of the casting direction component of the heat flux vector on the inner wall surface of the continuous casting mold derived by the computer processor, wherein the computer processor derives, as the molten metal surface level, a position where an absolute value of the value of the casting direction component of the heat flux vector whose vector of the casting direction component is in a direction opposite to the casting direction is maximum.

A method for detecting a molten metal surface level in a continuous casting mold of the present invention includes: a temperature acquisition step of acquiring temperatures measured by a plurality of temperature measurement devices embedded in the continuous casting mold along a casting direction of the continuous casting mold; a heat flux derivation step of deriving a value of a casting direction component of a heat flux vector on an inner wall surface of the continuous casting mold, based on a result of performing analysis of non-stationary heat conduction inverse problems from the temperatures acquired by the temperature acquisition step; and a molten metal surface level derivation step of deriving a molten metal surface level inside the continuous casting mold, based on the value of the casting direction component of the heat flux vector on the inner wall surface of the continuous casting mold derived by the heat flux derivation step, wherein the molten metal surface level derivation step derives, as the molten metal surface level, a position where an absolute value of the value of the casting direction component of the heat flux vector whose vector of the casting direction component is in a direction opposite to the casting direction is maximum.

A program, stored in a computer-readable storage medium and executable by a computer processor including processing circuitry, of the present invention causes a computer to execute: a temperature acquisition step of acquiring temperatures measured by a plurality of temperature measurement devices embedded in a continuous casting mold along a casting direction of the continuous casting mold; a heat flux derivation step of deriving a value of a casting direction component of a heat flux vector on an inner wall surface of the continuous casting mold, based on a result of performing analysis of non-stationary heat conduction inverse problems from the temperatures acquired by the temperature acquisition step; and a molten metal surface level derivation step of deriving a molten metal surface level inside the continuous casting mold, based on the value of the casting direction component of the heat flux vector on the inner wall surface of the continuous casting mold derived by the heat flux derivation step, wherein the molten metal surface level derivation step derives, as the molten metal surface level, a position where an absolute value of the value of the casting direction component of the heat flux vector whose vector of the casting direction component is in a direction opposite to the casting direction is maximum.

Advantageous Effects of Invention

According to the present invention, it is possible to increase the detection accuracy of the molten metal surface level in the continuous casting mold.

DESCRIPTION OF EMBODIMENTS (Molten Metal Surface Level Detection System in a Continuous Casting Mold)

Figure 1:
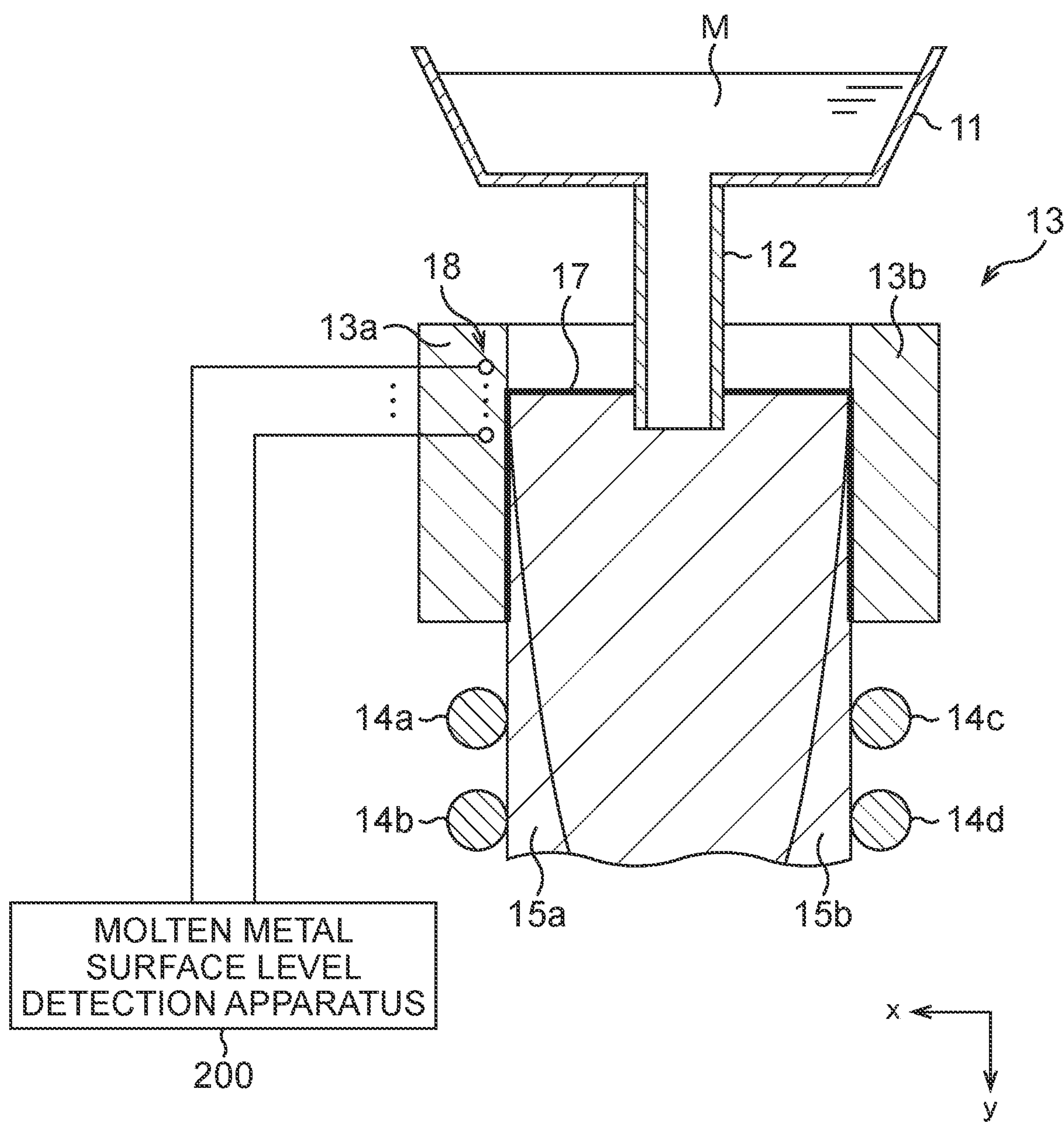
FIG. 1 is a view illustrating an example of a configuration of a system for detecting a molten metal surface level in a continuous casting mold.

FIG. 1 is a view illustrating an example of a configuration of a system for detecting a molten metal surface level in a continuous casting mold. FIG. 1 illustrates a cross section of a continuous casting machine obtained by cutting it along its height direction (a y-axis direction).

In FIG. 1, the continuous casting machine has a tundish 11, an immersion nozzle 12, a mold 13, and pinch rolls 14*a* to 14*d*. Note that the continuous casting machine can be realized by a publicly-known technique. Accordingly, the detailed description of the continuous casting machine will be omitted here.

The tundish 11 temporarily stores molten metal M supplied from a ladle.

The mold 13 is disposed below the tundish 11 with a gap intervening between the mold 13 and the tundish 11. The mold 13 has, for example, two short side parts 13*a*, 13*b*, and two long side parts. The two short side parts 13*a*, 13*b* are arranged with a gap intervening between them to be opposed to each other in a width direction (an x-axis direction). The two long side parts are arranged with a gap intervening between them to be opposed to each other in a depth direction (a direction perpendicular to an x-axis and a y-axis). A region surrounded by the two long side parts and the two short side parts 13*a*, 13*b* becomes a region in a hollow rectangular parallelepiped shape. This region becomes a region inside the mold 13. Further, a groove is formed on an outer wall surface of the mold 13. The mold 13 is water-cooled by running water through the groove. Note that only the short side parts of the long side parts and the short side parts are illustrated in FIG. 1 for convenience of illustration.

The immersion nozzle 12 injects the molten metal M stored in the tundish 11 to the inside of the mold 13. The immersion nozzle 12 is disposed such that its base end is located at the bottom surface of the tundish 11 and a predetermined region on the tip end side is located inside the mold 13. Further, the inside of the immersion nozzle 12 and the inside of the tundish 11 are communicated with each other. Note that the supply amount of the molten metal M to be supplied from the tundish 11 to the immersion nozzle 12 is adjusted by a sliding nozzle or a stopper.

A plurality of pairs of pinch rolls 14*a* to 14*d* are arranged along a conveyance path for steel drawn downward from the mold 13. Note that only two pairs of pinch rolls 14*a* to 14*d* are illustrated in FIG. 1. However, more pinch rolls are actually arranged according to the length of the conveyance path. Outside the pinch rolls 14*a* to 14*d*, a plurality of cooling sprays are arranged. The plurality of cooling sprays spray cooling water for cooling the steel drawn downward from the mold 13, to the steel.

As described above, the molten metal injected to the inside of the mold 13 is cooled by the mold 13 and solidified due to formation of solidified shells 15_a_, 15_b_ from its surface. The steel having a surface being the solidified shells 15_a_, 15_b_ and an inside being not solidified is continuously drawn from a lower end portion of the mold 13 while being sandwiched between the pinch rolls 14_a_ to 14_d_. In the process of being drawn from the mold 13 in this manner, the cooling water sprayed from the cooling sprays proceeds cooling of the steel to solidify the steel up to the inside. The thus-solidified steel is cut into a predetermined size on the downstream side of the continuous casting machine, whereby a cast slab different in shape of the cross section such as slab, bloom, billet or the like is manufactured.

In manufacturing the cast slab by the continuous casting machine as described above, powder 17 is added as needed to the molten metal inside the mold 13. A thin film of the powder 17 exists also between an inner wall surface of the mold 13 and the solidified shells 15_a_, 15_b_ as well as on the surface of the molten metal inside the mold 13. The addition of the powder 17 in this manner achieves retention of heat of the molten metal, prevention of oxidation of the molten metal, absorption of inclusion in the molten metal, securement of lubricity of the solidified shells 15_a_, 15_b_, and adjustment of removal of heat of the molten metal. Uniform generation of the solidified shells 15_a_, 15_b_ near the meniscus in the mold 13 in the above manner prevents surface crack of the solidified shells 15_a_, 15_b_ and prevents seizing between the mold 13 and the solidified shells 15_a_, 15_b_.

In the mold 13, a plurality of thermocouples 18 are embedded along the casting direction (the y-axis direction). The number of the plurality of thermocouples 18 is preferably three or more. According to the calculation accuracy of a later-described heat flux, the number of the plurality of thermocouples 18 and the interval between two adjacent thermocouples 18 can be decided. Further, in the example illustrated in FIG. 1, the plurality of thermocouples 18 are embedded in a region relatively closer to the inner wall surface of the inner wall surface and the outer wall surface of the mold 13. However, the plurality of thermocouples 18 do not always need to be embedded in such a region as long as they are embedded in the mold 13. As illustrated in FIG. 1, a case where the plurality of thermocouples 18 are embedded in the short side part 13_a_ will be described as an example in this embodiment. However, a plurality of thermocouples may be embedded in at least any one of the short side part 13_b_ and the two long side parts in addition to or instead of the short side part 13_a_. The inner wall surface of the mold 13 is called an operation surface, and the outer wall surface thereof is called a water cooled surface. The surface in contact with the molten metal of the surfaces of the mold 13 is the operation surface. However, in the case where the powder 17 is added as illustrated in FIG. 1, the surface in contact with the powder 17 of the surfaces of the mold 13 is the operation surface.

(Apparatus 200 for Detecting a Molten Metal Surface Level in a Continuous Casting Mold)

Figure 2:
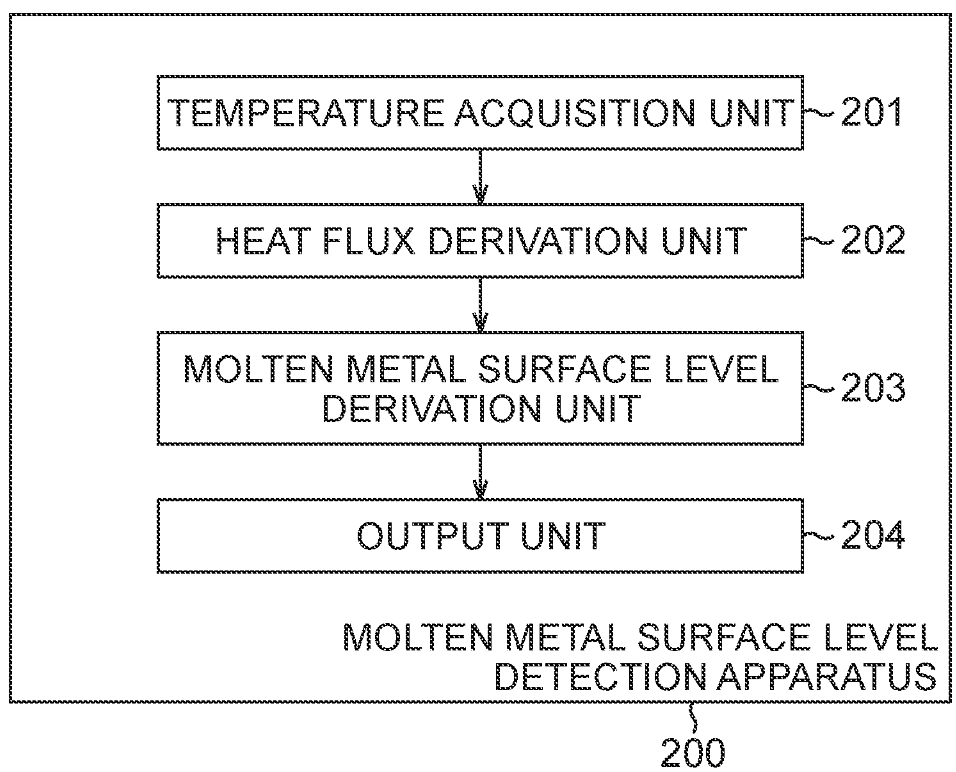
FIG. 2 is a diagram illustrating an example of a functional configuration of the apparatus for detecting the molten metal surface level in the continuous casting mold.

FIG. 2 is a diagram illustrating an example of a functional configuration of the apparatus 200 for detecting the molten metal surface level in the continuous casting mold. The apparatus for detecting the molten metal surface level in the continuous casting mold is abbreviated as a molten metal surface level detection apparatus as needed.

The molten metal surface level detection apparatus 200 performs analysis of non-stationary heat conduction inverse problems using the temperatures measured by the plurality of thermocouples 18. The non-stationary heat conduction inverse problems here refer to a problem of estimating a boundary condition or an initial condition such as the temperature and the heat flux in a boundary region with the temperature information inside the region having been known, based on the non-stationary heat conduction equation dominating a calculation area. In contrast to this, non-stationary heat conduction forward problems refer to a problem of estimating the temperature information inside the region, based on a known boundary condition.

The molten metal surface level detection apparatus 200 calculates the value of a component in the y-axis direction (the casting direction of the mold 13) of a heat flux vector on the inner wall surface of the mold 13 using an interpolation/extrapolation temperature function obtained by performing the analysis of non-stationary heat conduction inverse problems. As will be described later, the interpolation/extrapolation temperature function is a function indicating the temperature of the mold 13 at a position (x, y) and a time t.

The molten metal surface level detection apparatus 200 detects a molten metal surface level, based on the value of a y-axis direction component of the heat flux vector on the inner wall surface of the mold 13. The molten metal surface level is the height position (a position in the y-axis direction) of the surface of the molten metal inside the mold 13.

The role of the mold 13 is cooling and solidification of the molten metal. Therefore, in discussing the detection of the molten metal surface level by performing the analysis of non-stationary heat conduction inverse problems, the behavior of the heat flux in an x-axis direction (a heat removal direction of the mold 13) has attracted attention, whereas the behavior of the heat flux in the y-axis direction (the casting direction of the mold 13) has not attracted attention. Further, the value of the y-axis direction component of the heat flux vector is smaller than the value of an x-axis direction component. Therefore, by the method of deriving the heat flux taking a discrete value as in the technique described in Patent Literature 2, if the value of the y-axis direction component of the heat flux vector is used, the error increases, causing a further decrease in the calculation accuracy of the heat flux. From the above, in the case of deriving the heat flux of the mold 13 by performing the analysis of non-stationary heat conduction inverse problems including the case of detecting the molten metal surface level by performing the analysis of non-stationary heat conduction inverse problems, the value of the x-axis direction component of the heat flux vector has been used heretofore.

In contrast to the above, the present inventors have reached an idea of detecting the molten metal surface level, based on the inference that "on the molten metal surface inside the mold 13, the magnitude of the vector in a direction opposite (namely, facing the normal direction to the molten metal surface) to the casting direction of the vector of the y-axis direction component of the heat flux vector becomes large as compared with that at the other portion of the mold 13 due to the influence of the heat removal by the powder 17" because the powder 17 is supplied onto the molten metal surface inside the mold 13. Under such an idea, the molten metal surface level detection apparatus 200 in this embodiment has been realized. Hereinafter, an example of a concrete configuration of the molten metal surface level detection apparatus 200 in this embodiment will be described.

The molten metal surface level detection apparatus 200 has a temperature acquisition unit 201, a heat flux derivation unit 202, a molten metal surface level derivation unit 203, and a output unit 204.

<Temperature Acquisition Unit 201>

The temperature acquisition unit 201 receives input of temperatures [K] measured by the plurality of thermocouples 18, and outputs the temperatures measured at the same time by the plurality of thermocouples 18. The temperature acquisition unit 201 performs such output of the temperatures at each predetermined sampling time. For example, the temperature acquisition unit 201 receives input of and outputs the temperatures measured by the plurality of thermocouples 18 every time the sampling time elapses.

<Heat Flux Derivation Unit 202>

Based on the temperatures outputted from the temperature acquisition unit 201, an interpolation/extrapolation temperature function u^(x, y, t) for estimating the temperature of the mold 13 is used to make a mathematical expression of predicting the temporal change in temperature distribution on a two-dimensional cross section in the casting direction (the y-axis direction)–the heat removal direction (the x-axis direction) of the mold 13.

Figure 3A:
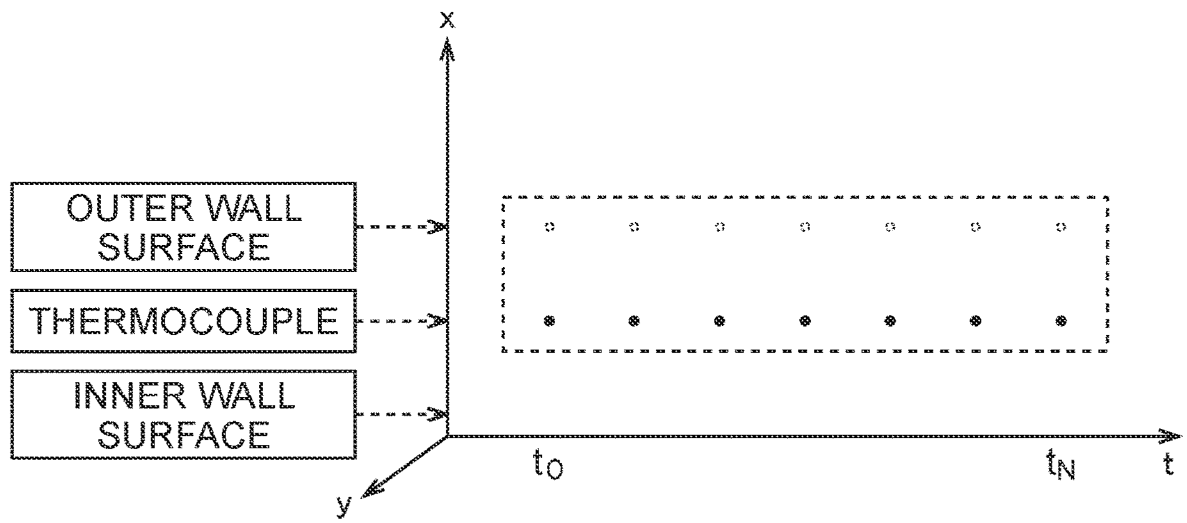
FIG. 3A is a chart illustrating an example of a two-dimensional cross section of a space x-time t of a coordinate system of non-stationary heat conduction inverse problems.
Figure 3B:
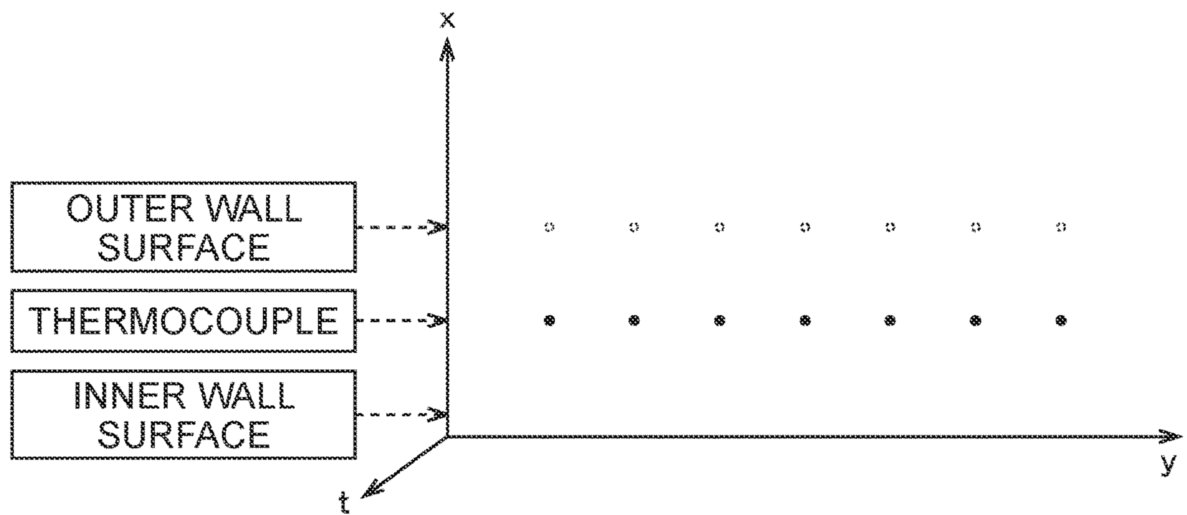
FIG. 3B is a chart illustrating an example of a two-dimensional cross section of a space x-space y of the coordinate system of the non-stationary heat conduction inverse problems.

FIG. 3A is a chart illustrating an example of a coordinate system of the non-stationary heat conduction inverse problems. FIG. 3A illustrates a definition point of the information amount on the two-dimensional cross section of a space x-time t at a certain position in the y-axis direction. FIG. 3B is also a chart illustrating an example of the coordinate system of the non-stationary heat conduction inverse problems. FIG. 3B illustrates a definition point of the information amount on the two-dimensional cross section of a space x-space y at a certain time t. FIG. 3A and FIG. 3B illustrate the two-dimensional cross sections of the same three-dimensional coordinates (coordinates of a space x-space y-time t).

In FIG. 3A and FIG. 3B, the x-axis is an axis where the inner wall surface of the mold 13 is x=0, and indicates the position in the heat removal direction of the mold 13. The y-axis is an axis where the upper end of the mold 13 is y=0, and indicates the position in the casting direction of the mold 13. The x-axis and the y-axis are space axes. The t-axis is a time axis.

In FIG. 3A and FIG. 3*b*, plots indicated by black circles are definition points of the information amounts, respectively. The definition point of the information amount indicates the position of the thermocouple 18 and the time when the temperature was measured by the thermocouple 18. The information amount at the definition point includes the temperature measured by the thermocouple 18.

Plots indicated by broken lines are also definition points of the information amounts, respectively. The definition point of the information amount indicates the position on the outer wall surface of the mold 13 and the time when the heat flux on the outer wall surface is estimated. In this embodiment, a case where a temperature measurement means such as the thermocouple is not provided on the outer wall surface of the mold 13 will be described as an example. Hence, the information amount at the definition point is regarded as the heat flux decided with a heat transfer coefficient $\gamma$ between the material constituting the mold 13 and water and a water temperature $u_w$ having been known.

The plots indicated by the black circles and the plots indicated by the broken lines in the above are used as the definition points of the information amounts. More specifically, each of the points on the three-dimensional coordinates of the x-axis—the y-axis—the t-axis represented by the plots indicated by the black circles and the plots indicated by the broken lines illustrated in FIG. 3A and the plots indicated by the black circles and the plots indicated by the broken lines illustrated in FIG. 3B is the definition point of the information amount.

In FIG. 3A, a timing $t_N$ is a timing when the latest temperatures were measured by the plurality of thermocouples 18. In FIG. 3A, a case where every time the temperatures measured by the plurality of thermocouples 18 are acquired, seven temperature measurement timings (seven timings such as timings $t_O$ to $t_N$) are employed in sequence from the new one as a time t when the definition point of the information amount is decided will be described as an example. More specifically, when the temperatures measured by the plurality of thermocouples 18 are newly acquired, the heat flux derivation unit 202 excludes the definition point of the information amount including the oldest temperature measurement timing of the seven temperature measurement timings, from the seven definition points of the information amounts. The heat flux derivation unit 202 then adds the definition point of the information amount including the latest temperature measurement timing to the seven definition points of the information amounts. Note that the number of times t deciding the definition points of the information amounts is not limited to seven.

Besides, in FIG. 3B, a case where seven thermocouples 18 are arranged at regular intervals along the y-axis direction as the plurality of thermocouples 18 will be illustrated as an example. However, the interval between two thermocouples 18 adjacent to each other does not need to be the regular interval. Besides, the number of the plurality of thermocouples 18 is not limited to seven.

The heat flux derivation unit 202 derives a weight vector $\lambda_j$ included in the interpolation/extrapolation temperature function u^(x, y, t) on the basis of the above definition points of the information amounts.

An example of the interpolation/extrapolation temperature function u^(x, y, t) will be described here.

First, the quadratic non-stationary heat conduction equation is expressed by the following (1) expression.

[Expression 1]

$$\frac{\partial u}{\partial t} - a^2\left(\frac{\partial^2 u}{\partial x^2} + \frac{\partial^2 u}{\partial y^2}\right) = 0, \quad (1)$$

$$0 < x < 1,\ 0 < y < 1,\ 0 < t < t_{max}$$

In the (1) expression, a is a square root of the thermal diffusion coefficient [m²/s] of the material constituting the mold. Besides, 0<x<1 and 0<y<1 indicate that the coordinates (x, y) on the x-axis and the y-axis are standardized by [0, 1]. More specifically, each coordinate on the x-axis is decided so that the coordinate on the x-axis on the inner wall surface of the mold 13 is "0" and the coordinate on the x-axis on the outer wall surface thereof is "1". Further, each coordinate on the y-axis is decided so that the coordinate on the y-axis at the upper end of the mold 13 is "0" and the coordinate on the y-axis at the lower end thereof is "1".

The boundary condition on the outer wall surface (the cooled surface) of the mold 13 is expressed by the following (2) expression.

[Expression 2]

$$-\beta\frac{\partial u}{\partial x}(1, y, t) = \gamma\left(u(1, y, t) - \frac{g(t)}{\gamma}\right) \quad (2)$$

In the (2) expression, g(t) is a product ($g(t)=u_w \times \gamma$) of the water temperature $u_w$ [K] and the heat transfer coefficient $\gamma$ [$W/m^2K$] between the material constituting the mold 13 and water. $\beta$ is a heat conductivity [W/mk] of the material constituting the mold 13. Each of the water temperature $u_w$, the heat transfer coefficient between the material constituting the mold 13 and water, and the heat conductivity $\beta$ of the material constituting the mold 13 is a value set in advance. As the water temperature $u_w$, for example, an average value in a predetermined time can be used.

The (2) expression is an expression expressing the balance between the heat fluxes on the outer wall surface of the mold 13. More specifically, the (2) expression is an expression expressing that following first heat flux and second heat flux are equal. The first heat flux is a heat flux based on the temperature gradient in the heat removal direction of the mold 13 on the outer wall surface of the mold 13 and on the heat conductivity $\beta$ of the material constituting the mold 13. The second heat flux is a heat flux based on the difference between a temperature u (l, y, t) on the outer wall surface of the mold 13 and the water temperature $u_w$ and on the heat transfer coefficient $\gamma$ between the material constituting the mold 13 and water.

In this embodiment, a thermocouple temperature function u(x*, y*, t) is expressed by the following (3) expression.

[Expression 3]

$$u(x^*,y^*,t)=h(t),x^*\in[0,1],y^*\in[0,1] \quad (3)$$

In the (3) expression, x* is a coordinate on the x-axis of the position of the thermocouple 18. y* is a coordinate on the y-axis of the position of the thermocouple 18. The thermocouple temperature function u(x*, y*, t) is a function indicating the temperature measured by the thermocouple 18, and is a function of the position (x, y) of the thermocouple 18 and the time t. h(t) is the temperature at the time t measured by the thermocouple 18. Beside, $x^*\in[0, 1]$ and $y^*\in[0, 1]$ indicate that the coordinates (x*, y*) on the x-axis and the y-axis of the thermocouple 18 are standardized by [0, 1]. More specifically, the x-axis of the thermocouple 18 is decided so that the coordinate on the x-axis on the inner wall surface of the mold 13 is "0" and the coordinate on the x-axis on the outer wall surface thereof is "1". Further, the y-axis of the thermocouple 18 is decided so that the coordinate on the y-axis at the upper end of the mold 13 is "0" and the coordinate on the y-axis at the lower end thereof is "1".

In this embodiment, the interpolation/extrapolation temperature function $\hat{u}(x, y, t)$ is expressed by the following (4) expression.

[Expression 4]

$$u\wedge(x, y, t) = \sum_{j=1}^{m+l} \lambda_j \phi(x-x_j, y-y_j, t-t_j) \quad (4)$$

In the (4) expression, the interpolation/extrapolation temperature function $\hat{u}(x, y, t)$ is a temperature satisfying the quadratic non-stationary heat conduction equation expressed by the (1) expression, and is an approximate solution of the temperature u.

$x_j$ and $y_j$ are elements (the coordinate on the x-axis and the coordinate on the y-axis) of an arbitrary reference position vector ($x_j$, $y_j$). $t_j$ is an arbitrary reference time. A point on the three-dimensional coordinates decided by the reference position vector ($x_j$, $y_j$) and the reference time $t_j$ is called a center point. Normally, the reference position vector ($x_j$, $y_j$) and the reference time $t_j$ are made coincident with the above-described definition point of the information amount, and this also applies to this embodiment. However, the reference position vector ($x_j$, $y_j$) and the reference time $t_j$ do not have to be made coincident with the above-described definition point of the information amount.

j is a variable that identifies the above-described center point (the point on the three-dimensional coordinates decided by the reference position vector ($x_j$, $y_j$) and the reference time $t_j$), and an integer in a range from 1 to m+l.

m is expressed by $n_{p1}\times n_t$, and l is expressed by $n_{p2}\times n_t$.

$n_{p1}$ is the number of the center points j on the outer wall surface of the mold 13. The center point j on the outer wall surface of the mold 13 is set so that the interpolation/extrapolation temperature function $\hat{u}(x, y, t)$ satisfies the (2) expression. $n_{p2}$ is the position of the thermocouple 18. The position of the thermocouple 18 is set so that the interpolation/extrapolation temperature function $\hat{u}(x, y, t)$ satisfies the (3) expression. $n_t$ is the number of times. This time is set so that the interpolation/extrapolation temperature function $\hat{u}(x, y, t)$ satisfies the (2) expression and the (3) expression. As described above, m is the number of center points j decided by the positions on the outer wall surface of the mold 13 and times. Besides, l is the number of the center points j decided by the positions of the thermocouples 18 and times.

In this embodiment, the center point j is made coincident with the definition point of the information amount. Accordingly, in the examples illustrated in FIG. 3A and FIG. 3B, the maximum value m+l of j is the sum of the plots indicated by the black circles and the plots indicated by broken lines. Concretely, the number of the center points j decided by the positions on the outer wall surface of the mold 13 and times is 49 (=7×7), and the number l of the center points j decided by the positions of the thermocouples 18 and times is 49 (=7×7).

$\phi(x-x_j, y-y_j, t-t_j)$ is a basis function decided by the following (5) expression and (6) expression.

[Expression 5]

$$\phi(x, y, t) = F(x, y, t+T) \quad (5)$$

$$F(x, y, t) = \frac{1}{2a\sqrt{\pi t}} e^{-(x^2+y^2)/4a^2 t} H(t) \quad (6)$$

In the (6) expression, H(t) is a Heaviside function. The (6) expression is an expression expressed in the form of a fundamental solution satisfying the quadratic non-stationary heat conduction equation expressed in the (1) expression. Note that the fundamental solution is a solution (the temperature u) of the quadratic non-stationary heat conduction equation when the initial condition of the temperature u is expressed by a $\delta$ function. In the (5) expression, T is a parameter for adjusting the diffusion profile of the fundamental solution of the quadratic non-stationary heat conduction equation, and is set in advance. T is a value more than 0.

As described above, the basis function $\phi(x-x_j, y-y_j, t-t_j)$ is a function expressed in the form of the fundamental solution satisfying the quadratic non-stationary heat conduction equation on the basis of the center point j (the reference position vector ($x_j$, $y_j$) and the reference time $t_j$).

$\lambda_j$ is a weight vector representing the weight of the basis function $\phi(x-x_j, y-y_j, t-t_j)$ with respect to the interpolation/extrapolation temperature function u^(x, y, t). The weight vector $\lambda_j$ is decided by the balance between the influence of the basis function $\phi(x-x_j, y-y_j, t-t_j)$ on the interpolation/extrapolation temperature function u^(x, y, t) and the influence of another basis function $\phi(x-x_j, y-y_j, t-t_j)$ different from the above basis function $\phi(x-x_j, y-y_j, t-t_j)$ on the interpolation/extrapolation temperature function u^(x, y, t). The basis function $\phi(x-x_j, y-y_j, t-t_j)$ exists for each center point j, and the weight vector $\lambda_j$ also exists for each center point j.

As described above, the interpolation/extrapolation temperature function u^(x, y, t) is expressed by the total sum of the values at respective center points j of the products of the basis function $\phi(x-x_j, y-y_j, t-t_j)$ and the weight vector $\lambda_j$.

The weight vector $\lambda_j$ is expressed by the following (7) expression to (10) expression.

[Expression 6]

$$A\lambda = b \tag{7}$$

$$A = \begin{bmatrix} \beta\frac{\partial\phi}{\partial x}(x_k - x_j, y_k - y_j, t_k - t_j) + \\ \gamma\phi(x_k - x_j, y_k - y_j, t_k - t_j) \\ \phi(x_s - x_j, y_s - y_j, t_s - t_j) \end{bmatrix} \tag{8}$$

$$\lambda = [\lambda_j] \tag{9}$$

$$b = \begin{bmatrix} g_k \\ h_{s-m} \end{bmatrix} \tag{10}$$

In the (8) expression and the (10) expression, k is a variable that identifies the definition point of the information amount, and is an integer from 1 to m (k=1, . . . , m). s is a variable that identifies the definition point of the information amount, and is an integer from m+1 to m+l (s=m+1, . . . , m+l). j is an integer from 1 to m+l (j=1, . . . , m+l).

A matrix A is a (m+l)×(m+l) matrix. b and λ are (m+l)-dimensional column vectors. As described above, (m+l) is the number of center points j.

In the (8) expression, "$\beta\partial\phi/\partial x(x_k-x_j, y_k-y_j, t_k-t_j)+\gamma\phi(x_k-x_j, y_k-y_j, t_k-t_j)$" in [ ] of A=[ ] represents a k-row and j-column component of the matrix A, and "$\phi(x_s-x_j, y_s-y_j, t_s-t_j)$" represents an s-row and j-column component of the matrix A.

To $g_k$ in [ ] of b=[ ], g(t) expressed in the (2) expression is given. $g_k$ in [ ] represents a k-row component of a matrix b. To $h_{s-m}$ in [ ] of b=[ ], h(t) expressed in the (3) expression is given. $h_{s-m}$ in [ ] represents an s-row component of the matrix b.

As described above, k is a variable that identifies the definition point of the information amount, and is an integer from 1 to m (k=1, . . . , m). m is expressed by $n_{p1}\times n_t$. $n_{p1}$ is the number of the center points j on the outer wall surface of the mold 13. The coordinate on the x-axis is decided so that the coordinate on the x-axis on the inner wall surface of the mold 13 is "0" and the coordinate on the x-axis on the outer wall surface thereof is "1". Accordingly, in the (8) expression, $x_k$ becomes "1".

The (7) expression to the (10) expression are expressions for deriving the weight vector $\lambda_j$ by substituting the information on the definition point of the information amount into simultaneous equations of the (2) expression and the (4) expression and solving the simultaneous equations so as to satisfy the quadratic non-stationary heat conduction equation of the (1) expression, the boundary condition on the outer wall surface of the mold 13 of the (2) expression, the thermocouple temperature function (the temperature measured by the thermocouple in the mold 13 at each position (x*, y*) and at each time t) of the (3) expression, and the interpolation/extrapolation temperature function of the (4) expression. The information on the definition point of the information amount substituted into the simultaneous equations includes the position of the definition point of the information amount, the temperature by the thermocouple 18, the temperature measurement timing of the thermocouple 18, the water temperature $u_w$, the heat conductivity β of the material constituting the mold 13, the heat transfer coefficient γ between the material constituting the mold 13 and water, and the thermal diffusion coefficient a of the material constituting the mold 13. The water temperature $u_w$, the heat conductivity β of the material constituting the mold 13, the heat transfer coefficient γ between the material constituting the mold 13 and water, and the thermal diffusion coefficient a of the material constituting the mold 13 may be made different depending on the definition point of the information amount, or may be made the same. Besides, in solving the simultaneous equations of the (2) expression and the (4) expression, the position of the center point j is also substituted into the simultaneous equations.

The heat flux derivation unit 202 derives the weight vector $\lambda_j$ by the (7) expression to the (10) expression in the above manner.

The heat flux derivation unit 202 performs the above processing every time of acquiring the temperature from the temperature acquisition unit 201.

In this embodiment, the value $q_y$ of the y-axis direction component of the heat flux vector is expressed by the following (11) expression.

[Expression 7]

$$q_y = \beta\frac{\partial u \wedge (x=0, y, t)}{\partial y} = -\beta\sum_{j=1}^{m+1}\lambda_j\frac{y - y_j}{4a^3(t-t_j)\sqrt{\pi(t-t_j)}}H(t-t_j) \tag{11}$$

Accordingly, the heat flux derivation unit 202 derives the value $q_y$ of the y-axis direction component of the heat flux vector on the inner wall surface of the mold 13 by substituting the heat conductivity β of the material constituting the mold 13, the thermal diffusion coefficient a of the material constituting the mold 13, the reference time $t_j$, the number m+l of the center points j, and the weight vector $\lambda_j$ derived as described above, into the (11) expression.

<Molten Metal Surface Level Derivation Unit 203>

The molten metal surface level derivation unit 203 derives the relation between the value $q_y$ of the y-axis direction component of the heat flux vector and the position in the y-axis direction, from the value $q_y$ of the y-axis direction component of the heat flux vector derived by the heat flux derivation unit 202. The molten metal surface level derivation unit 203 derives, from the relation, the position where the value $q_y$ of the y-axis direction component of the heat flux vector has a negative value and its absolute value is maximum (namely, minimum), as the molten metal surface level. In this embodiment, the y-axis is defined as illustrated in FIG. 1. Accordingly, the position where the value $q_y$ of the y-axis direction component of the heat flux vector on the inner wall surface of the mold 13 becomes minimum (the absolute value of negative values is maximum) is the molten metal surface level. Note that when the y-axis is defined to be the direction opposite to the direction illustrated in FIG. 1, the position where the value $q_y$ of the y-axis direction component of the heat flux vector on the inner wall surface of the mold 13 is maximum is the molten metal surface level. As described above, the molten metal surface level derivation unit 203 derives, as the molten metal surface level, the position where the absolute value of the value $q_y$ of the y-axis direction component of the heat flux vector whose y-axis component vector is in the direction opposite to the casting direction (namely, directed in the normal direction to the molten metal surface) is maximum.

<Output Unit 204>

The output unit 204 outputs the information on the molten metal surface level derived by the molten metal surface level derivation unit 203. As the output form of the information on the molten metal surface level, at least one of display on a computer display, storage into a storage medium in the molten metal surface level detection apparatus 200 or a portable storage medium, and transmission to an external device can be employed.

(Flowchart)

Next, an example of the operation of the molten metal surface level detection apparatus 200 in this embodiment will be described referring to the flowchart in FIG. 4.

At Step S401, the temperature acquisition unit 201 acquires the temperatures measured by the plurality of thermocouples 18.

Next, at Step S402, the heat flux derivation unit 202 determines whether the required number of temperatures for deriving the weight vector $\lambda_j$ have been acquired or not. Concretely, the heat flux derivation unit 202 waits until one temperature as the number of the definition point of the information amount with respect to the thermocouple 18 is acquired. In the examples illustrated in FIG. 3A and FIG. 3B, the heat flux derivation unit 202 waits until 49 temperatures are acquired because there are seven definition points of the information amounts in the y-axis direction and there are seven definition points of the information amounts in the t-axis direction. Note that in the case where the 49 temperatures have been already acquired, when the temperatures corresponding to the seven definition points of the information amounts in the y-axis direction are acquired at the same time, the heat flux derivation unit 202 deletes the temperatures at the oldest time among the temperatures corresponding to the seven definition points of the information amounts in the y-axis direction at the same time, and adds the temperatures acquired this time.

When the required number of temperatures for deriving the weight vector $\lambda_j$ have not been acquired as a result of the determination, the flow returns to Step S401. Then, the processing at Steps S401 and S402 is repeatedly performed until the required number of temperatures for deriving the weight vector $\lambda_j$ are acquired. When the required number of temperatures for deriving the weight vector $\lambda_j$ are acquired, the flow proceeds to Step S403.

When proceeding to Step S403, the heat flux derivation unit 202 derives the weight vector $\lambda_j$ by the (7) expression to the (10) expression.

Next, at Step S404, the heat flux derivation unit 202 derives the value $q_y$ of the y-axis direction component of the heat flux vector on the inner wall surface of the mold 13 by the (11) expression.

Next, at Step S405, the molten metal surface level derivation unit 203 derives the relation between the value $q_y$ of the y-axis direction component of the heat flux vector and the position in the y-axis direction. The molten metal surface level derivation unit 203 derives, from the derived relation, the position where the value $q_y$ of the y-axis direction component of the heat flux vector has a negative value and its absolute value is maximum (namely, minimum), as the molten metal surface level.

Next, at Step S406, the output unit 204 outputs the information on the molten metal surface level derived by the molten metal surface level derivation unit 203.

Next, at Step S407, the molten metal surface level detection apparatus 200 determines whether to end the derivation of the molten metal surface level. This determination is performed, for example, based on the operation by an operator to the molten metal surface level detection apparatus 200.

When the derivation of the molten metal surface level is not ended as a result of the determination, the flow returns to Step S401. Then, the processing at Steps S401 to S407 is repeatedly performed every time temperatures are newly acquired at Step S401.

Figure 4:
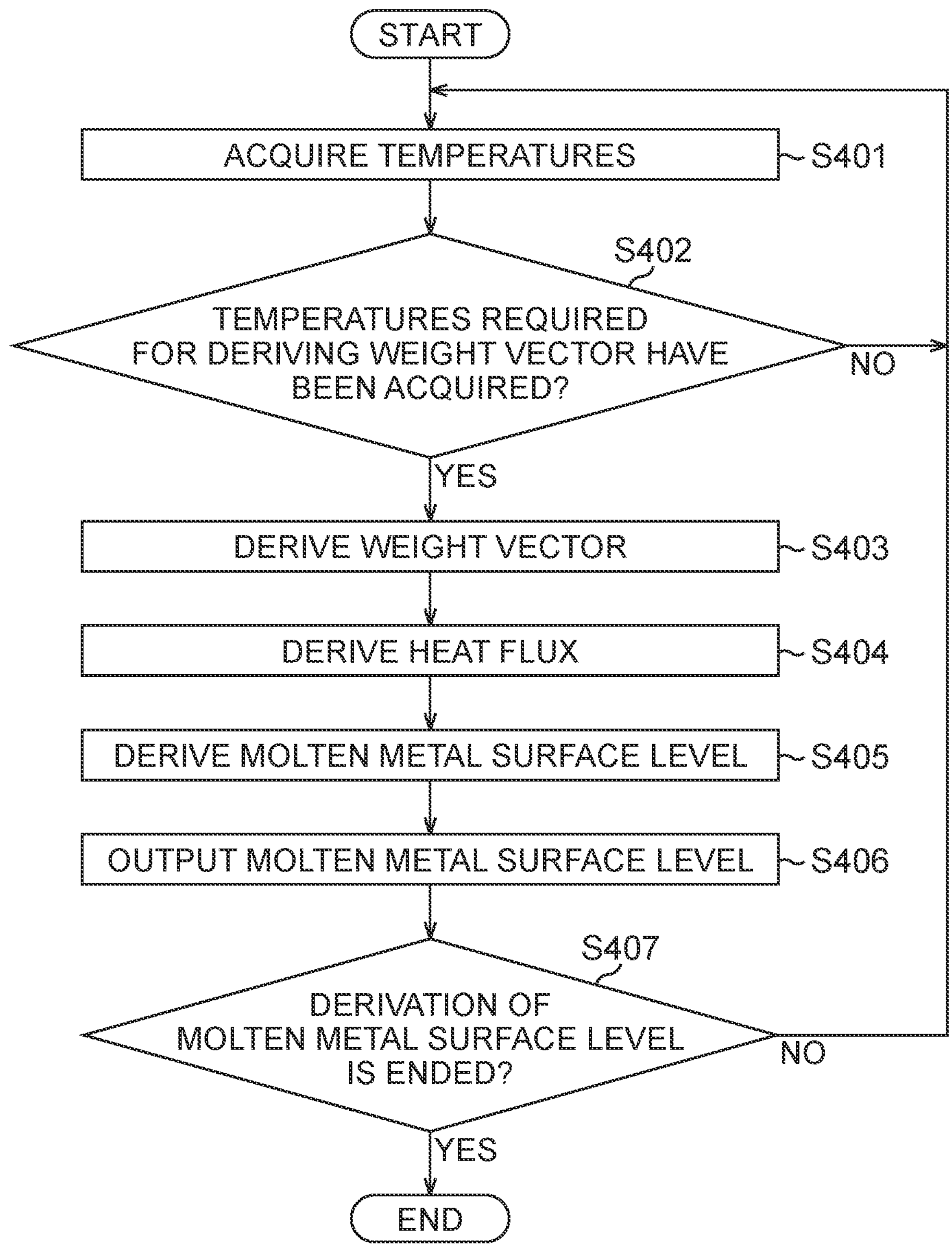
FIG. 4 is a flowchart for explaining an example of the operation of the molten metal surface level detection apparatus.

On the other hand, when the derivation of the molten metal surface level is ended, the processing by the flowchart in FIG. 4 is ended.

(Hardware of the Apparatus 200 for Detecting the Molten Metal Surface Level in the Continuous Casting Mold)

Figure 5:
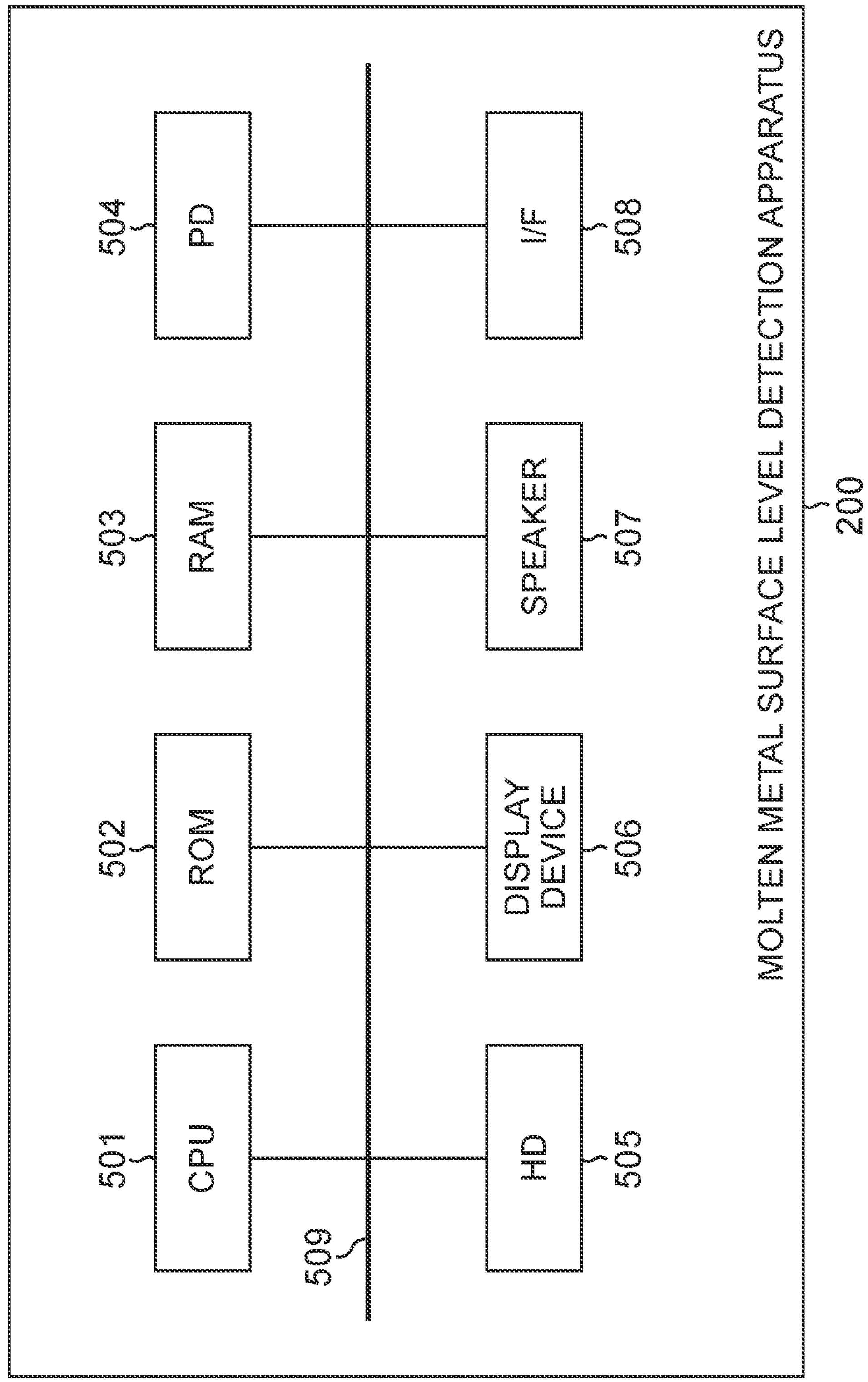
FIG. 5 is a diagram illustrating an example of a hardware configuration of the molten metal surface level detection apparatus.

FIG. 5 is a diagram illustrating an example of a hardware configuration of the molten metal surface level detection apparatus 200.

As illustrated in FIG. 5, the molten metal surface level detection apparatus 200 has a CPU (Central Processing Unit) 501, a ROM (Read Only Memory) 502, a RAM (Random Access Memory) 503, a PD (Pointing Device) 504, an HD (Hard Disk) 505, a display device 506, a speaker 507, an I/F (Interface) 508, and a system bus 509.

The CPU 501 centrally controls the operation in the molten metal surface level detection apparatus 200. The CPU 501 controls the components (502 to 508) of the molten metal surface level detection apparatus 200 via the system bus 509.

The ROM 502 stores a BIOS (Basic Input/Output System) and an operating system program (OS) being control programs of the CPU 501, and programs required for the CPU 501 to execute the processing by the above-described flowchart illustrated in FIG. 4 and so on.

The RAM 503 functions as a main memory, a work area and so on of the CPU 501. For executing the processing, the CPU 501 realizes various operations by loading necessary computer programs, information and so on from the ROM 502 and the HD 505 into the RAM 503 and executing processing on the computer programs, the information and so on. The computer program of executing the processing in the above-described flowchart in FIG. 4 may be stored in the HD 505.

The PD 504 is composed of, for example, a mouse, a keyboard or the like, and constitutes an operation input means for the operator to perform an operation input to the molten metal surface level detection apparatus 200 as needed.

The HD 505 constitutes a storage means that stored various kinds of information, data, files and so on.

The display device 506 constitutes a display means that displays various kinds of information and images, based on the control of the CPU 501.

The speaker 507 constitutes a sound output means that outputs sound relating to various kinds of information, based on the control of the CPU 501.

The I/F 508 performs communication of various kinds of information and so on with the external device, based on the control of the CPU 501. The temperature measured by the thermocouple 18 is inputted into the molten metal surface level detection apparatus 200 via the I/F 508.

The system bus 509 is a bus for connecting the CPU 501, the ROM 502, the RAM 503, the PD 504, the HD 505, the display device 506, the speaker 507, and the I/F 508 so that they can communicate with one another.

EXAMPLES

Figure 6:
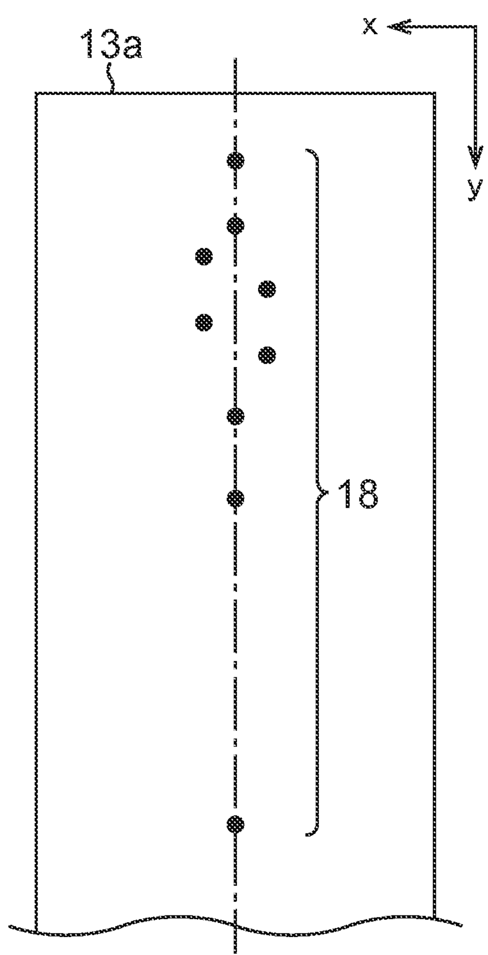
FIG. 6 is a view illustrating positions of thermocouples in an example.

The molten metal surface level detected by the method of this embodiment, the molten metal surface level detected by an existing method, and the actually measured molten metal surface level were compared. As illustrated in FIG. 6, the plurality of thermocouples 18 are embedded in the short side part 13*a* of the mold 13. As illustrated in FIG. 6, the plurality of thermocouples 18 do not have to be embedded in the mold 13 accurately along the y-axis direction. However, the above-described weight vector $\lambda_j$ is derived with the coordinates on the x-axis of the thermocouples 18 set to the same value. More specifically, the positions in the x-axis direction of the thermocouples 18 do not have to be precisely the same as long as they do not affect the accuracy of the weight vector $\lambda_j$. Further, the water temperature on the in-side (upper side) of the mold 13 and the water temperature on the out-side (lower side) of the mold 13 were measured and their average value was calculated and regarded as the temperature of the cooling water.

Figure 7A:
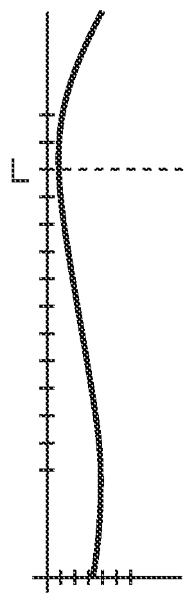
FIG. 7A is a chart conceptually illustrating an example of the relation between a value of a y-axis direction component of a heat flux vector on an inner wall surface of the mold and position in a y-axis direction.

In the method of this embodiment, the value $q_y$ of the y-axis direction component of the heat flux vector on the inner wall surface of the mold 13 is derived as described above. Then, the position where the absolute value of the value $q_y$ of the y-axis direction component of the heat flux vector whose y-axis component vector is in the direction opposite to the casting direction is maximum is determined as the molten metal surface level L. FIG. 7A conceptually illustrates an example of the relation, obtained by the method of this embodiment, between the value $q_y$ of the y-axis direction component of the heat flux vector on the inner wall surface of the mold 13 and the position in the y-axis direction.

Figure 7B:
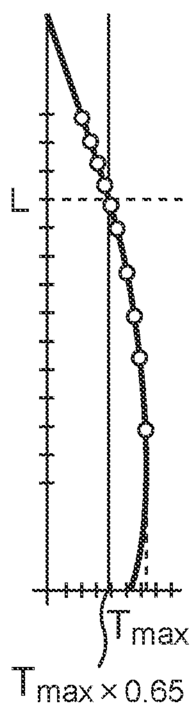
FIG. 7B is a chart conceptually illustrating the relation between a temperature in the mold and the position in the y-axis direction.

On the other hand, in the existing method, the temperature distribution in the mold 13 is calculated, and the position of a maximum temperature $(T_{max})\times 0.65$ is determined as the molten metal surface level L, based on the empirical rule. FIG. 7B conceptually illustrates an example of the relation, obtained by the existing method, between the temperature in the mold 13 and the position in the y-axis direction.

Figure 8:
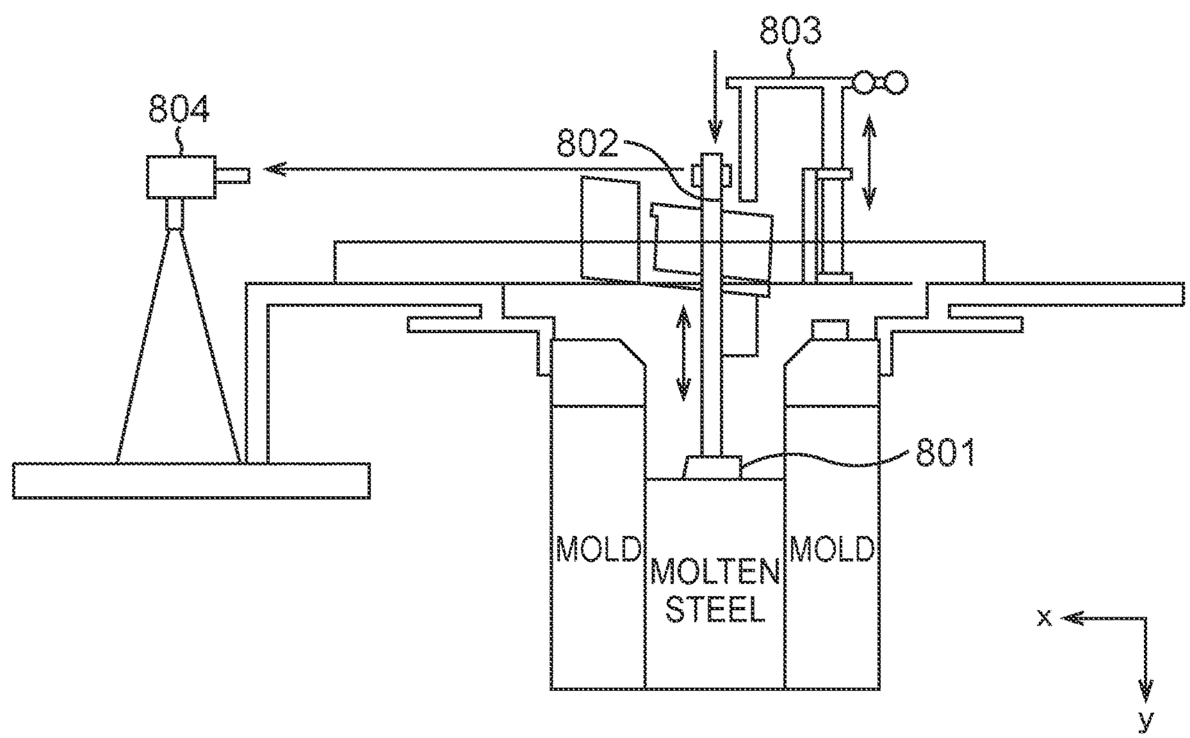
FIG. 8 is a view illustrating an example of a configuration of an apparatus for actually measuring the molten metal surface level.

The molten metal surface level was actually measured using an apparatus illustrated in FIG. 8. A float 801 is floated on the molten metal surface of the molten steel inside the mold, and a rod 802 is disposed on the float 801. Further, an oscillation measuring jig 803 is disposed. Then, the movement of the tip of the rod 802 and the movement of the tip of the oscillation measuring jig 803 are image-captured by a video camera 804. Image processing is performed on the image captured by the video camera 804 to digitalize and record the displacement in the y-axis direction of the molten metal surface. From the displacement in the y-axis direction of the molten metal surface, the molten metal surface level was obtained.

Figure 9:
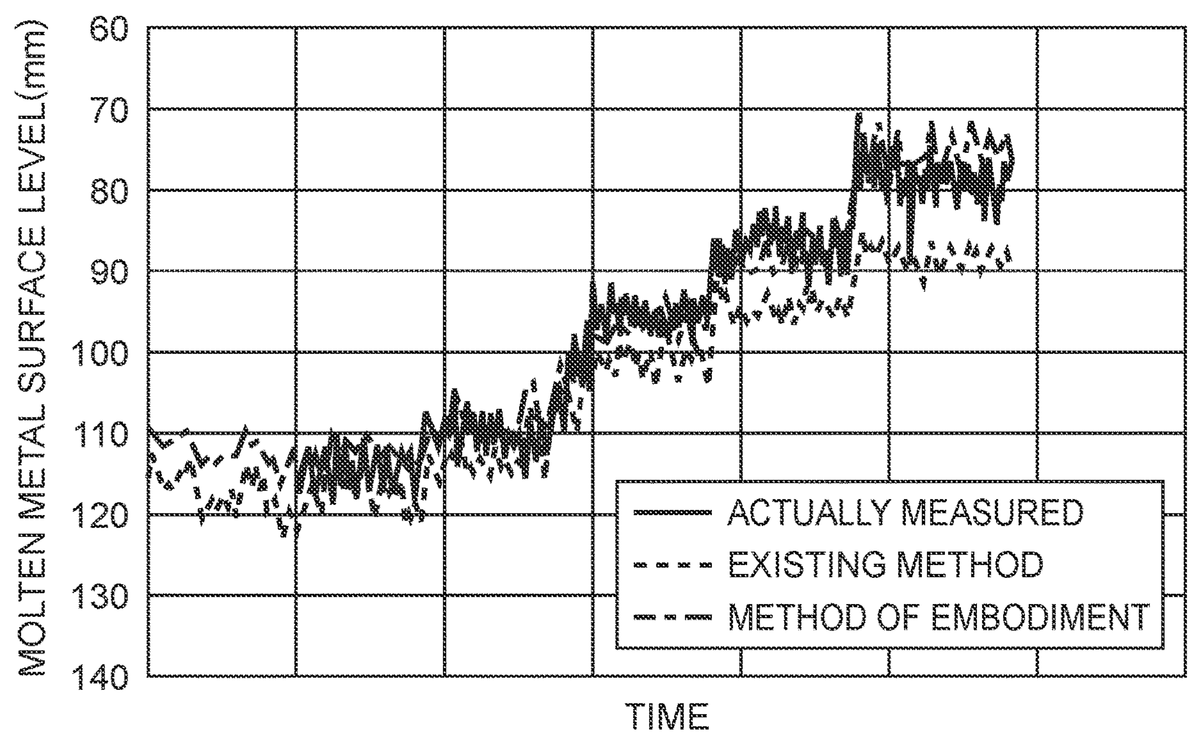
FIG. 9 is a view illustrating a molten metal surface level detected in an inventive example, a molten metal surface level detected by an existing method, and an actually measured molten metal surface level.

FIG. 9 illustrates the molten metal surface level detected by the method of this embodiment, the molten metal surface level detected by the existing method, and the actually measured molten metal surface level. The horizontal axis indicates time and the longitudinal axis indicates the molten metal surface level.

The existing method extremely decreases in detection accuracy when the actually measured molten metal surface level rises, and cannot follow the actually measured value.

In contrast to the above, it is found that the method of this embodiment can follow the actually measured value in a wide range. Taking into consideration that there is variation of about 5 to 10 mm in actually measurement accuracy of the molten metal surface level, the molten metal surface level detected by the method of this embodiment can be said to be in a good correspondence with the actually measured molten metal surface level.

As described above, this embodiment detects the molten metal surface level while grasping the influence of the heat transfer at the molten metal surface position of the molten steel inside the mold 13, such as the heat removal by the powder 17. More specifically, the position where the absolute value of the value $q_y$ of the y-axis direction component of the heat flux vector whose y-axis component vector is in the direction opposite to the casting direction is maximum, is detected as the molten metal surface level. Accordingly, the detection accuracy of the molten metal surface level can be increased. This makes it possible to stably control the molten metal surface level, and prevent overflow of the molten steel and roll-in of suspended substance to achieve the improvement in the internal quality of the cast slab. Further, this contributes to stabilization of operation and improvement in quality such as prevention of corrosion trouble due to local erosion of the immersion nozzle 12 and falling of the tip of the immersion nozzle 12, improvement in detection accuracy of drift of the molten steel inside the mold 13 and so on.

Further, in this embodiment, a value obtained by multiplying a value, which is obtained by partially differentiating the interpolation/extrapolation temperature function $\hat{u}(x, y, t)$ continuously taking values by y, by the heat conductivity $\beta$ of the material constituting the mold 13 is derived as the value $q_y$ of the y-axis direction component of the heat flux vector. Accordingly, the calculation accuracy of the heat flux can be increased as compared with the case where the heat flux is derived as a discrete value.

Further, in this embodiment, the interpolation/extrapolation temperature function $\hat{u}(x, y, t)$ is expressed by the total sum of the products of the basis function $\phi(x-x_j, y-y_j, t-t_j)$ and the weight vector $\lambda_j$. The interpolation/extrapolation temperature function $\hat{u}(x, y, t)$ expressed in this way and the boundary condition representing the balance between the heat fluxes on the outer wall surface of the mold 13 of the quadratic non-stationary heat conduction equation are used as the simultaneous equations to derive the weight vector $\lambda_j$. Accordingly, the thermocouples in use can be composed of only the plurality of thermocouples arranged in one line along the y-axis direction. This eliminates the need to arrange the thermocouples in a plurality of lines in the x-axis direction.

INDUSTRIAL APPLICABILITY

The present invention can be used for detection of the molten metal surface level of the molten steel in the continuous casting mold.

The invention claimed is:

1. An apparatus for detecting a molten metal surface level in a continuous casting mold, the apparatus comprising:

a computer processor including processing circuitry programmed to perform operations comprising:

acquiring temperatures measured by a plurality of temperature measurement devices embedded in the continuous casting mold along a casting direction of the continuous casting mold;

deriving a value of a casting direction component of a heat flux vector on an inner wall surface of the continuous casting mold, based on a result of performing analysis of non-stationary heat conduction inverse problems from the temperatures acquired by the computer processor; and deriving a molten metal surface level inside the continuous casting mold, based on the value of the casting direction component of the heat flux vector on the inner wall surface of the continuous casting mold derived by the computer processor, wherein the computer processor is programmed to derive, as the molten metal surface level, a position where an absolute value of the value of the casting direction component of the heat flux vector whose vector of the casting direction component is in a direction opposite to the casting direction is maximum.

2. The apparatus for detecting the molten metal surface level in the continuous casting mold according to claim 1, wherein the analysis of non-stationary heat conduction inverse problems is analysis of non-stationary heat conduction inverse problems using an interpolation/extrapolation temperature function satisfying a non-stationary heat conduction equation, and wherein the interpolation/extrapolation temperature function is a function $\hat{u}(x, y, t)$ indicating a temperature inside the continuous casting mold at a position x in an x-axis direction being a heat removal direction of the continuous casting mold, a position y in a y-axis direction being the casting direction of the continuous casting mold, and a time t.

3. The apparatus for detecting the molten metal surface level in the continuous casting mold according to claim 2, wherein the interpolation/extrapolation temperature function $\hat{u}(x, y, t)$ is expressed by a total sum of values at respective center points j of products of a basis function $\phi_j$ decided for each center point j and a weight vector $\lambda_j$ decided for each center point j, wherein the center point j is a point decided by a reference position vector $(x_j, y_j)$ indicating a position that is a reference in the x-axis direction and the y-axis direction of the continuous casting mold and a reference time $t_j$, which is a point on three-dimensional coordinates decided by positions in the x-axis direction and the y-axis direction of the continuous casting mold and a time, and wherein the basis function $\phi_j$ is a function expressed in a form of a fundamental solution satisfying the non-stationary heat conduction equation based on the center point j.

4. The apparatus for detecting the molten metal surface level in the continuous casting mold according to claim 3, wherein the computer processor derives a value $q_y$ of a y-axis direction component of the heat flux vector on the inner wall surface of the continuous casting mold by a following (A) expression, where following β is a heat conductivity of a material constituting the continuous casting mold, following a is a square root of a thermal diffusion coefficient of the material constituting the continuous casting mold, following $H(t-t_j)$ is a Heaviside function, and following m+1 is a number of the center points j,

[Expression 1]

$$q_y = -\beta \sum_{j=1}^{m+1} \lambda_j \frac{y - y_j}{4a^3(t - t_j)\sqrt{\pi(t - t_j)}} H(t - t_j). \quad \text{(A)}$$

5. The apparatus for detecting the molten metal surface level in the continuous casting mold according to claim 3, wherein each of a point decided by a position on an outer wall surface of the continuous casting mold and a time, which is a point on three-dimensional coordinates decided by positions in the x-axis direction and the y-axis direction of the continuous casting mold and a time, and a point decided by a position where the temperature measurement devices is embedded and a time, which is a point on three-dimensional coordinates decided by positions in the x-axis direction and the y-axis direction of the continuous casting mold and a time, is regarded as a definition point of information amount, wherein the computer processor derives the weight vector $\lambda_j$ by substituting the information on the definition point of the information amount into simultaneous equations of a boundary condition in the non-stationary heat conduction equation and the interpolation/extrapolation temperature function $\hat{u}(x, y, t)$ and solving the simultaneous equations so as to satisfy the non-stationary heat conduction equation, the boundary condition in the non-stationary heat conduction equation, a thermocouple temperature function $u(x^*, y^*, t)$, and the interpolation/extrapolation temperature function $\hat{u}(x, y, t)$, and derives the value $q_y$ of the y-axis direction component of the heat flux vector on the inner wall surface of the continuous casting mold using the weight vector $\lambda_j$, wherein the boundary condition in the non-stationary heat conduction equation is an expression indicating that a heat flux based on a temperature gradient in the x-axis direction on the outer wall surface of the continuous casting mold and on the heat conductivity of the material constituting the continuous casting mold is equal to a heat flux based on a difference between a temperature on the outer wall surface of the continuous casting mold and a water temperature and on a heat transfer coefficient between the material constituting the continuous casting mold and water, wherein the plurality of temperature measurement devices are embedded in the continuous casting mold along the casting direction at positions different from the outer wall surface of the continuous casting mold, and wherein the thermocouple temperature function $u(x^*, y^*, t)$ is a function indicating a temperature measured by the temperature measurement devices at a position $x^*$ of the temperature measurement devices in the x-axis direction of the continuous casting mold, a position $y^*$ of the temperature measurement devices in the y-axis direction of the continuous casting mold, and a time t.

6. The apparatus for detecting the molten metal surface level in the continuous casting mold according to claim 5, wherein positions in the x-axis direction of the plurality of temperature measurement devices are same.

7. The apparatus for detecting the molten metal surface level in the continuous casting mold according to claim 5, wherein the weight vector $\lambda_j$ is calculated by following (B) expression to (E) expression, where following m is a number of the center points j decided by positions on the outer wall surface of the continuous casting mold and times, following l is a number of the center points j decided by positions of the temperature measurement devices and times, following k is an integer from 1 to m for identifying the definition point of the information amount, following s is an integer from m+1 to m+1 for identifying the definition point of the information amount, following j is an integer from 1 to m+1 for identifying the definition point of the information amount, following $\beta$ is a heat conductivity of the material constituting the continuous casting mold, following $\gamma$ is a heat transfer coefficient between the material constituting the continuous casting mold and water, following $h_{s-m}$ is a temperature measured by the temperature measurement devices, following $g_k$ is a product of water temperature and the heat transfer coefficient $\gamma$ between the material constituting the continuous casting mold and water, following A is a (m+1)×(m+1) matrix, following $B\partial\phi(x_k-x_j, y_k-y_j, t_k-t_j)+\gamma\phi(x_k-x_j, y_k-y_j, t_k-t_j)$ in [ ] of A is a value of a k-row and j-column component of the matrix A, following $\phi(x_s-x_j, y_s-y_j, t_s-t_j)$ in [ ] of A is a value of an s-row and j-column component of the matrix A, following b is a (m+1)-dimensional column vector, following $g_k$ in [ ] of b is a value of a k-row component of a matrix b, following $h_{s-m}$ in [ ] of b is a value of an s-row component of the matrix b, and following $\lambda$ is a (m+1)-dimensional column vector,

[Expression 2]

$$A\lambda = b \tag{B}$$

$$A = \begin{bmatrix} \beta\frac{\partial\phi}{\partial x}(x_k - x_j, y_k - y_j, t_k - t_j) + \\ \gamma\phi(x_k - x_j, y_k - y_j, t_k - t_j) \\ \phi(x_s - x_j, y_s - y_j, t_s - t_j) \end{bmatrix} \tag{C}$$

$$\lambda = [\lambda_j] \tag{D}$$

$$b = \begin{bmatrix} g_k \\ h_{s-m} \end{bmatrix}. \tag{E}$$

8. A method for detecting a molten metal surface level in a continuous casting mold with the apparatus according to claim 1, the method comprising:

a temperature acquisition step of acquiring temperatures measured by a plurality of temperature measurement devices embedded in the continuous casting mold along a casting direction of the continuous casting mold;

a heat flux derivation step of deriving a value of a casting direction component of a heat flux vector on an inner wall surface of the continuous casting mold, based on a result of performing analysis of non-stationary heat conduction inverse problems from the temperatures acquired by the temperature acquisition step; and a molten metal surface level derivation step of deriving a molten metal surface level inside the continuous casting mold, based on the value of the casting direction component of the heat flux vector on the inner wall surface of the continuous casting mold derived by the heat flux derivation step, wherein the molten metal surface level derivation step derives, as the molten metal surface level, a position where an absolute value of the value of the casting direction component of the heat flux vector whose vector of the casting direction component is in a direction opposite to the casting direction is maximum.

9. A computer-readable storage medium recording a program, executable by a computer processor including processing circuitry, for causing the apparatus according to claim 1 to execute:

a temperature acquisition step of acquiring temperatures measured by a plurality of temperature measurement devices embedded in a continuous casting mold along a casting direction of the continuous casting mold;

a heat flux derivation step of deriving a value of a casting direction component of a heat flux vector on an inner wall surface of the continuous casting mold, based on a result of performing analysis of non-stationary heat conduction inverse problems from the temperatures acquired by the temperature acquisition step; and a molten metal surface level derivation step of deriving a molten metal surface level inside the continuous casting mold, based on the value of the casting direction component of the heat flux vector on the inner wall surface of the continuous casting mold derived by the heat flux derivation step, wherein the molten metal surface level derivation step derives, as the molten metal surface level, a position where an absolute value of the value of the casting direction component of the heat flux vector whose vector of the casting direction component is in a direction opposite to the casting direction is maximum.

* * * * *